United States Patent [19]

Eikill et al.

[11] Patent Number: 5,371,875
[45] Date of Patent: Dec. 6, 1994

[54] LOGIC ON MAIN STORAGE MEMORY CARDS FOR INSERTION AND EXTRACTION OF TAG BITS

[75] Inventors: Richard G. Eikill; Quentin G. Schmierer, both of Rochester, Minn.

[73] Assignee: International Business Machines Corporation, Armonk, N.Y.

[21] Appl. No.: 966,908

[22] Filed: Oct. 26, 1992

Related U.S. Application Data

[63] Continuation of Ser. No. 466,894, Jan. 18, 1990, abandoned.

[51] Int. Cl.⁵ .................. G06F 12/02; G06F 13/12
[52] U.S. Cl. ........................ 395/425; 364/DIG. 1
[58] Field of Search ... 364/200 MS File, 900 MS File; 395/400 MS, 425 MS

[56] References Cited

U.S. PATENT DOCUMENTS

| | | | |
|---|---|---|---|
| 3,771,139 | 11/1973 | Digby | 364/200 |
| 4,241,396 | 12/1980 | Mitchell et al. | 364/200 |
| 4,442,487 | 4/1984 | Fletcher et al. | 395/425 |
| 4,689,765 | 8/1987 | Hooper | 364/900 |
| 4,712,190 | 12/1987 | Guglielmi et al. | 364/900 |
| 4,740,971 | 4/1988 | Tarn et al. | 371/10.3 |
| 4,797,812 | 1/1989 | Kihara | 395/400 |
| 4,914,577 | 4/1990 | Stewart et al. | 364/200 |
| 4,996,666 | 2/1991 | Dulvk, Jr. | 365/189.01 |
| 5,060,145 | 10/1991 | Scheuneman et al. | 364/200 |
| 5,075,842 | 12/1991 | Lai | 395/425 |

FOREIGN PATENT DOCUMENTS 2225657  1/1989  United Kingdom .

OTHER PUBLICATIONS

*IBM Technical Disclosure Bulletin*, R. L. Hoffman, M. E. Houdck, and F. G. Soltis "Tag Handling for Pointers", vol. 25, No. 2, Jul. 1982, pp. 763–767.

*IBM Technical Disclosure Bulletin*, vol. 24, No. 10, Mar. 1982, "Improved Tagged Pointer Verification", D. J. Thornforde, pp. 5298–5299.

IBM Technical Disclosure Bulletin, vol. 17, No. 7, Dec. 1974, "Tagged Main Storage For Control Functions", by C. R. Attanasio.

*Primary Examiner*—Joseph L. Dixon
*Assistant Examiner*—Reba I. Elmore
*Attorney, Agent, or Firm*—Frederick W. Niebuhr; J. Michael Anglin

[57] ABSTRACT

A data processing network includes multiple processing devices, multiple memory cards of main storage, and a shared interface. Each of the memory cards includes memory arrays, an internal register for temporarily storing a pointer data word read from the arrays, and logic circuitry. When one of the processing devices sends a tag bit extraction or tag bit insertion command to one of the memory cards, the pointer to be modified is retrieved from a selected address in the memory arrays and latched into the internal register. The logic circuitry provides the tag bits to an AND logic gate and provides the AND gate output to the processor in the case of tag bit extraction. For tag bit insertion, the circuitry applies the pointer from the arrays and a tag bit input from the processor, as inputs to a multiplexer and provides the multiplexer output back to the selected address in the arrays.

19 Claims, 3 Drawing Sheets

| 0 - 31 | 32 | 33 - 39 |
| 40 - 71 | 72 | 73 - 79 |
| 80 - 111 | 112 | 113 - 119 |
| 120 - 151 | 152 | 153 - 159 |

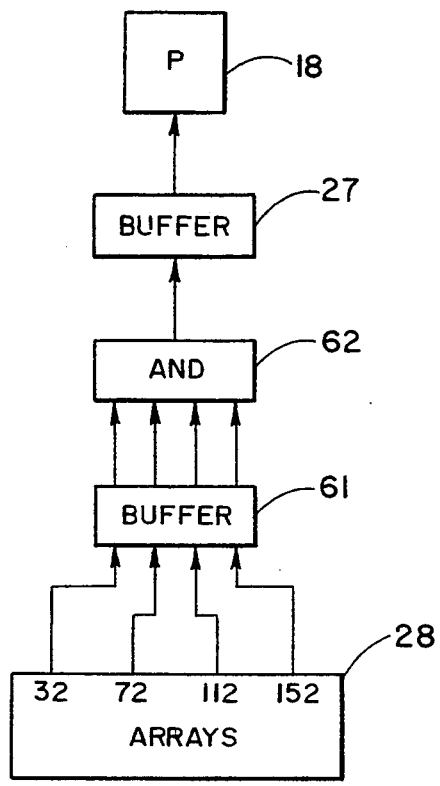
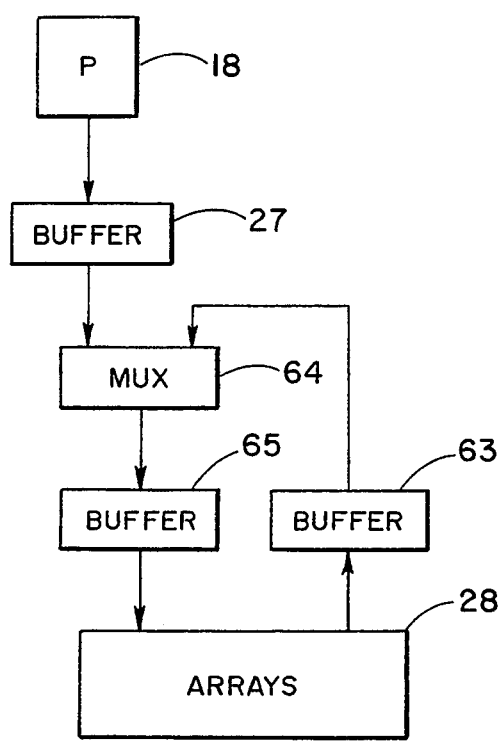

LOGIC ON MAIN STORAGE MEMORY CARDS FOR INSERTION AND EXTRACTION OF TAG BITS

This is a continuation of copending application Ser. No. 07/466,894, filed on Jan. 18, 1990 now abandoned.

BACKGROUND OF THE INVENTION

The present invention relates to information processing systems including multiple processing devices linked to multiple memory cards of main storage through a shared interface, and more particularly to means for inserting and extracting tag bits from data stored in main memory with minimal interaction of the processors with main storage through the interface.

In recent years, the performance of information in processing devices has improved considerably, particularly in terms of more rapid performance of data processing operations. Information processing networks increasingly employ multiple processing devices sharing a common interface for transmitting data between the processors and main storage, which typically is composed of multiple memory cards. Improvements in memory subsystems have not kept pace with improvements in processors, particularly when multiple, parallel processors are used in the network. Accordingly, system or network architectures have been modified to compensate for a main storage which operates relatively slowly as compared to the processing devices. Cache memories and other techniques have been employed, in an attempt to uncouple the processors from the memory cards in main storage.

In certain information handling systems it is desired to identify some of the data words as "pointers", which contain, along with other bits, an address identifying a particular byte or number of bytes within a memory, in a particular main storage. To enhance system performance, it is advantageous to store pointers and other data words mixed, i.e. without reserving particular areas in main storage for exclusive storage of pointers. However, since a pointer in one area of main storage may be used to gain access to data in another area, the capability of checking the integrity of pointers is essential.

To this end, a hardware tag can be provided for each word in main storage. As disclosed in U.S. Pat. No. 4,241,396 (Mitchell et al), each pointer is a "quad" word having sixteen bytes, with each of the four words having a tag bit. The pointer is considered tagged (i.e. valid as a pointer) when all four hardware tag bits are set, and untagged when any of the tag bits is reset. The tag bits can be set only by tag instructions. All other instructions reset the tag bits. Thus, if a pointer is inadvertently modified by a data handling instruction rather than a tag instruction, the reset tag bits identify the pointer as not valid.

A number of modifications have been proposed to this system. For example, IBM Technical Disclosure Bulletin, Vol. 24, No. 10 (March 1982) relates to an improved pointer verification scheme involving accumulating all tag bits of the quad word, rather than checking the tag bit latches every eight bytes. IBM Technical Disclosure Bulletin, Vol. 25, No. 2 (July 1982) discloses storage of tag bits in a separate memory, apart from main storage. Quad words thus stored are said to be more compatible with conventional data word size formats, and the need to separate tag bits from data before writing the tag bits on a disc is eliminated. For most effective use of memory, active tag bits are stored in a high performance memory, with non-active tag bits provided to main storage.

It is advantageous to provide pointers in a format which permits mixed storage with other data in main storage, yet also desirable to store data in auxiliary devices, perhaps in formats which do not allow tag bits within data words. Thus, there is a need to modify the tag bits in data words transmitted between main storage and this type of auxiliary storage.

More particularly, data often is moved in page or multi-page lengths, with each page including, e.g. 512 bytes. Pointers and other data words are mixed in main storage, with the pointers identified individually by their associated tag bits. When a page of data is moved from main storage to auxiliary storage, however, the tag bits are extracted, i.e. accumulated and saved in a separate field as part of the page header which is moved into the auxiliary storage device first, followed by data. Conversely, when a page of data is moved from auxiliary storage to main storage, tag bits are reinserted into the appropriate tag bit locations.

These tag bit functions traditionally are carried out by the processor or processors, interacting with main storage through a bus or other interface between the processors and main storage. Tag extraction and insertion functions thus require considerable processor time and memory bus overhead, and require repeated access to the memory arrays in main storage, all to the detriment of network performance.

Therefore, it is an object of the present invention to provide a data processing system in which tag bits associated with address pointers in main storage can be extracted and reinserted, with substantially reduced use of the interface between main storage and multiple processors.

Another object of the invention is to transfer some of the intelligence involved in tag bit modifying operations from the processors to the memory cards of main storage.

A further object is to increase the speed at which tag modifying functions are performed.

Yet another object is to provide a data processing network in which the insertion of tag bits or other indicia into data words is accomplished with just one access to the arrays of main storage.

SUMMARY OF THE INVENTION

To achieve these and other objects, there is provided a system for processing bit-encoded data words, each data word having a plurality of bits including at least one tag bit. The system includes a processing device configuration for manipulating bit-encoded data, a memory having arrays for storing bit-encoded data as data words, each word including at least one tag bit, and an interface connected to the processing configuration and to the memory, for transmitting bit-encoded data between the processing configuration and memory. The processing configuration includes means for generating first commands for extracting the tag bits from designated data words, and means for generating address data corresponding to selected locations in the memory arrays where the designated data words are stored.

The network further includes a data manipulating means within the memory, for selectively performing tag bit operations on the designated data words in response to receiving the first commands. The manipulating means include an intermediate data retaining means; a latching means, responsive to one of the first commands and the address data, for locating one of the designated words in the memory arrays and transferring the designated word from the selected location to the intermediate data retaining means; a means for extracting each of the tag bits in the designated data word when the data word is contained in the intermediate data retaining means, for subsequent transmission of just the extracted tag bits to the processing configuration; and a write means for transferring the designated data word back to the memory arrays after the tag operation has been performed on the word.

Preferably the processing configuration further includes means for generating second commands for inserting tag bits into designated data words, and further for providing at least one tag bit corresponding to the designated data word to the memory via the interface. Then, the manipulating means further includes a means responsive to the second command for inserting each corresponding tag bit into the designated data word when the word is contained in the intermediate data retaining means.

Typically the processing configuration includes several processing devices, each with means for manipulating bit-encoded data and for generating the first and second commands. The memory includes a plurality of memory cards, each with data arrays for storing bit-encoded data. The interface includes a data bus for transmitting the tag bits between the processors and memory cards, and a command bus for transmitting the first and second commands and the address information. The data bus and command bus are shared by all of the processing devices and all of the memory cards. Each memory card has an internal register, with the internal registers together providing the intermediate data retaining means. In a preferred application, each memory card also has circuitry associated with its internal register, for providing the data word to be modified and the corresponding tag bits from one of the processors, as inputs to a multiplexer. The multiplexer receives the corresponding tag bits as inputs to designated tag bit positions to carry out the second command. Alternatively, the circuit response to the first command by providing data from all of the tag bit positions to an AND logic gate and providing the output of the AND gate to the processor.

In one specific application, the data words are pointer data words, and the tag bits identify each of the pointer data words as containing a valid virtual address.

As compared to the conventional approach of using the processors to control tag bit extraction and insertion, these functions when performed according to the present invention take less time, particularly in the instance of insertion. Performing these operations largely within main storage frees each processor to perform other tasks during virtually all of the time involved in tag bit insertion and extraction. The number of cycles required is reduced, as well as the time during which the interface or busses between the processors and memory cards are occupied, thus to improve system throughput. Finally, once one of the memory cards receives a command relating to tag bit insertion or extraction, it remains dedicated to completing this function, without degradation from interface traffic, array initialization overhead, or asynchronous memory refresh operations.

IN THE DRAWINGS

For a further appreciation of the above and other objects and advantages, reference is made to the following detailed description and to the drawings, in which:

FIGS. 3 and 4 are schematic views showing tag bit modification logic on one of the memory cards;

DETAILED DESCRIPTION OF THE PREFERRED EMBODIMENT

Figures 1, 2:
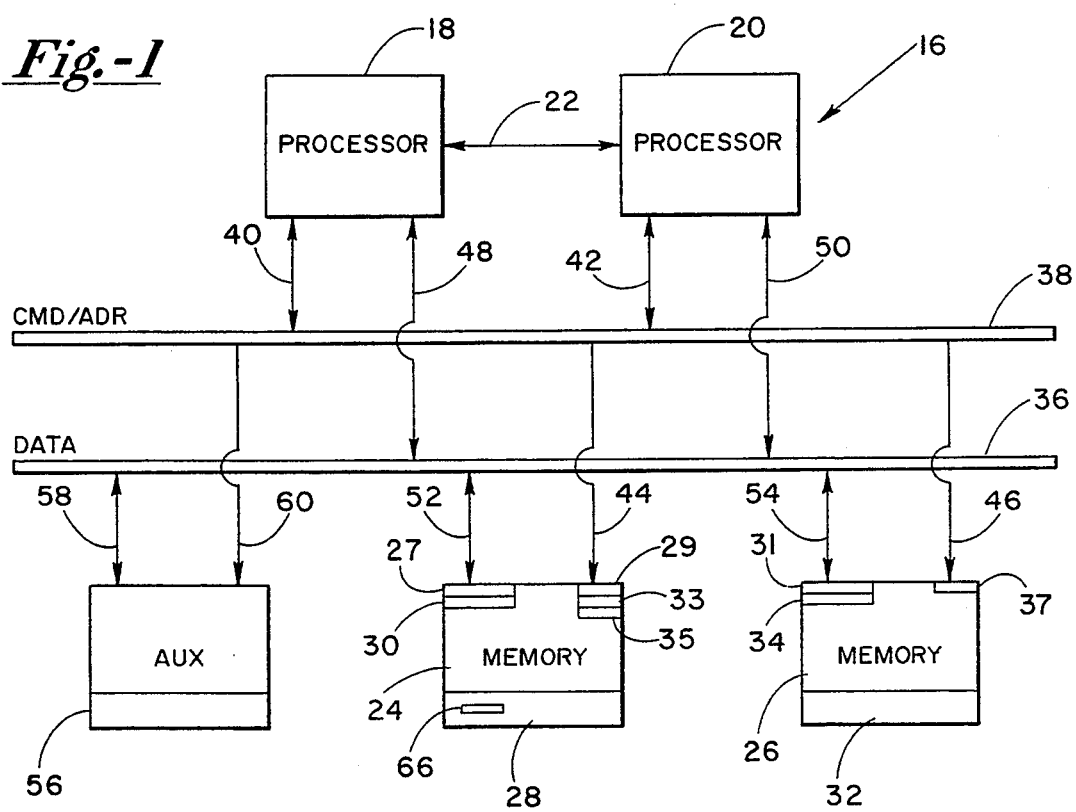
FIG. 1 is a schematic view of an information processing network in which multiple processing devices are associated with a main storage memory including multiple memory cards, through a shared interface.
FIG. 2 is a representation of a sixteen byte quad word used as an address pointer in the network.

Turning now to the drawings, there is shown in FIG. 1 an information processing network 16 for storing and performing selected operations upon bit-encoded data. The system includes two processing devices, identified at 18 and 20, each with circuitry for performing operations on data, and providing commands and related data for transfer to and from main storage. An arbitration link 22 joins the two processors, and is used in combination with arbitration logic residing in both processing devices to assign priority to either processor in terms of access to the interface. It is to be understood that the configuration of processing devices in this network could consist of a single processing device, or multiple processing devices in which multiple arbitration links are provided for a point-to-point connection of all processing devices.

An interface connects the processing devices with main storage, which includes multiple memory cards such as indicated at 24 and 26. Memory card 24, for example, includes a buffer 27, memory arrays 28 for storing bit-encoded data, and an internal register 30 connected to memory arrays 28. Data stored in the memory arrays is loaded into internal register 30 for temporary or intermediate storage, during which time tag bits may be either extracted from or inserted into the data.

Memory card 26 is similar to memory card 24, and includes a buffer 31, memory arrays 32 and an internal register 34. These components are substantially identical to and function in the same manner as their counterparts in memory card 24. It is to be understood that main storage can comprise multiple memory cards such as cards 24 and 26.

The interface associating the processors and memory cards includes a data bus 36 and a command/address bus 38, each joined to all of the processing devices and memory cards, and transmitting data in parallel with the other bus. Data bus 36 transmits what can conveniently be called working information, i.e. information in which users of the system have the most direct interest. Command/address bus 38 transmits control information, relating to commands to fetch, store or otherwise manipulate particular working data, and address information which identifies the location of particular working data words in the memory arrays, or the location to which such data is to be sent.

Command lines 40 and 42 transmit command and address information to bus 38, from which one of command lines 44 and 46 forwards information to the appropriate memory card. Command transfers are unidirectional (from a processor to a memory card), the arrows at both ends of command lines 40 and 42 indicating that each processing device, while transmitting a command, can inform the remaining processors as to the address and byte length of the access.

Data lines 48 and 50 between processors and bus 36, and data lines 52 and 54 between the memory cards and the data bus, accommodate transmissions of working information in both directions. The interface includes further data paths not illustrated in FIG. 1, for controlling use of data bus 36, and also may include a commonly shared communication bus for transmitting status information relating to working data. For a further explanation of the interface, reference is made to U.S. patent application Ser. No. 445,320, entitled "High Performance Shared Main Storage Interface", filed Dec. 4, 1989, and assigned to the assignee of the present application.

Network 16 further includes an auxiliary storage device 56, connected to data bus 36 by a line 58 and to command/address bus 38 by a line 60, thus to share the interface with the processors and memory cards. Storage device 56 might be an I/O device, but the specific type of device is not germane to the present invention, other than that the device is capable of receiving and storing data from the memory cards in main storage. Further, device 56 stores data in a format incompatible with the format of pointer data words stored in memory cards 24 and 26.

As mentioned above, pointer data words include tag bits which, when set, identify their associated pointers as containing valid virtual addresses. The tag bits enable the storage of pointers and other data in the memory arrays of each of memory cards 24 and 26, commingled in the sense that the memory cards do not have special areas designated for storing pointers versus other areas for storing other data. With this embodiment, the preferred pointer is a quad word with a four-bit stream of tag bits, one tag bit for each of four eight-byte words in the quad word.

The quad word format is shown in FIG. 2, with tag bits located at the 32nd, 72nd, 112th, and 152nd bit positions. Working data is stored in bit positions 0–31, 40–71, 80–111, and 120–151. The remaining bit positions, i.e. 33–39, 73–79, 113–119 and 153–159, are error correction code bit positions.

Internal registers 30 and 34 in memory cards 24 and 26 are particularly useful in performing tag bit modifications on pointers stored in the memory arrays, without transferring the pointers to the processing devices. Circuitry for tag bit modifications is shown in FIGS. 3 and 4 for tag bit extraction and insertion, respectively. In connection with tag extraction, data from tag bit positions 32, 72, 112, and 152 is provided through a buffer 61 to an AND logic gate 62. The output of AND gate 62 is provided to one of the processing devices, for example device 18, via data bus 36.

As seen in FIG. 4 in connection with tag insertion, data from processor 18, including tag bits, is provided as one of the inputs to a multiplexer 64. The other input to the multiplexer is data read from the arrays of memory card 24 and provided through a buffer 63. The input to the multiplexer from processor 18 updates only bit positions 32, 72, 112 and 152, thus to replace the four tag bits read from memory while the quad word is in internal register 30. The output of multiplexer 64 is written into the memory arrays via a buffer 65.

The remaining memory cards of main storage similarly include circuitry for retrieving data from the memory arrays and loading it into the internal register, either extracting or inserting tag bits to perform the appropriate tag function upon data in the internal register, and returning the modified data to the data arrays. One advantage of this approach is that circuitry for tag extract and insert functions resides largely in the memory cards, rather than in the processors, reducing the number of clock cycles required to perform these functions, with a substantial reduction occurring in the tag insert function.

This becomes apparent upon comparing the conventional approach to tag bit insertion and extraction, with these functions according to the present invention. Conventional, processor-controlled tag modification of pointers is illustrated in the timing diagram of FIG. 5. A fetch command, including address information corresponding to the location of requested data in main storage, is sent from the processor to the memory card via the command/address bus during the first clock cycle.

The selected memory card begins to perform an access to its memory arrays in the second clock cycle. More particularly, access to the arrays is provided through two control lines, row address strobe (RAS) and column address strobe (CAS). The row address strobe initiates the data array access by going active at the beginning of the second clock cycle, while the column address strobe goes active at the beginning of the third clock cycle. In connection with FIGS. 5 and 6, it should be noted that RAS and CAS are shown going high as they go active, as a matter of consistency with other lines. In practice, RAS and CAS are "minus-active", i.e. going active as the level goes low.

In clock cycle four, data is read out of the memory arrays and latched into an internal register. At the beginning of the fifth clock cycle, the row address and column address strobes go inactive. During the fifth and sixth clock cycles, the pointer data quad word is transferred to the processor via the data bus. This requires two cycles, due to the eight-byte width of the data bus. The modification occurs in the processor during the seventh clock cycle. If the modification is a tag extraction, the function is complete.

A tag bit insertion, however, requires further use of the interface. During the eighth clock cycle, a store command, including address information corresponding to the location that modified (tag bit inserted) data is to be stored, is sent from the processor to the memory card via the command/address bus. The modified data is transferred via the data bus from the processor to the memory card during the ninth and tenth clock cycles. The row address strobe goes active during the ninth clock cycle and the column address strobe goes active during the twelfth clock cycle. The modified data is written back into memory arrays during the twelfth clock cycle, after which the row address and column address strobes go inactive.

Figure 5:
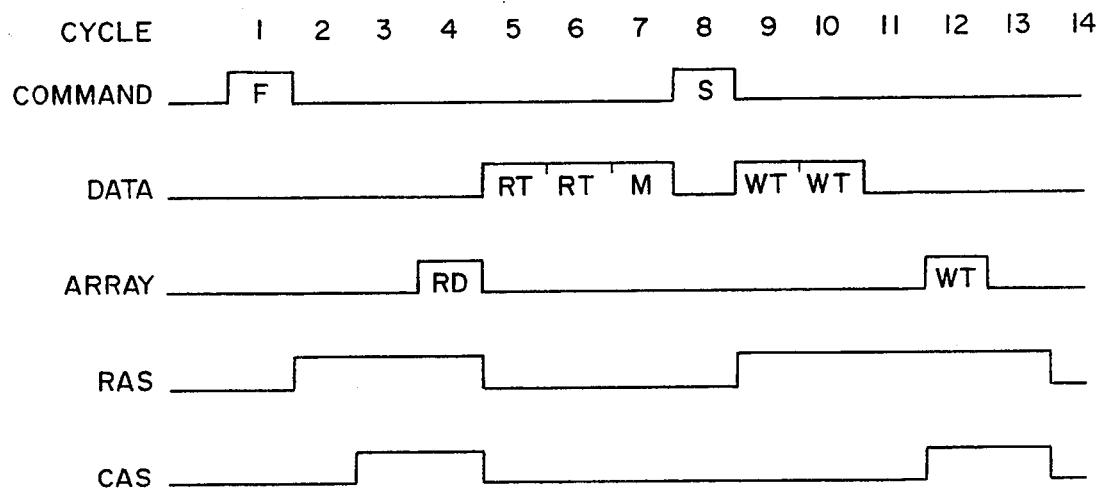
FIG. 5 is a timing diagram showing a conventional tag modifying operation.
Figure 6:
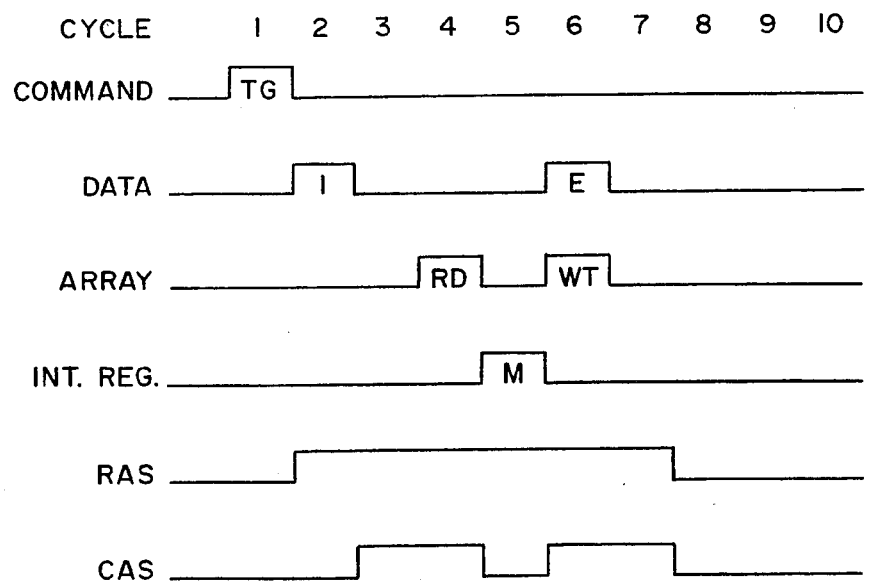
FIG. 6 is a timing diagram similar to that in FIG. 5, showing tag bit modification according to the present invention.

FIG. 6 is a timing diagram similar to that in FIG. 5, showing tag bit extraction and insertion conducted primarily on the memory card, pursuant to a command from processing device 18 to either extract the tag bits or insert tag bits into a pointer data word at a selected address 66 within memory arrays 28 of memory card 24. Processor 18 provides a tag bit modify command during the first cycle, either to extract or insert tag bits. If the command is to insert tag bits, the tag bits are provided to memory card 24 from the processor via data bus 36 during the second clock cycle. If the command was to extract tag bits, there is no transmission over the data bus during the second cycle. In any event, the row address strobe becomes active at the beginning of cycle two, and the column address strobe goes active at cycle three.

In connection with tag bit insertion, the pointer is read out of arrays 28 in the fourth cycle, the tag bits added during the fifth cycle, and the pointer written back into the arrays during the sixth cycle, after which the row address and column address strobes go inactive. For an extraction function, the pointer again is read out of the memory arrays during cycle four, the tag bits extracted during cycle four, and the tag bits are provided to processor 18 via the data bus during cycle five.

Thus, the circuitry resident on the memory cards slightly increases the speed of tag bit extraction functions, and substantially increases the speed of tag bit insertion functions on pointers in the memory arrays. Efficiency is increased well beyond what this comparison would suggest, however, since the above examples assume that the processors in each case required no time in contending for use of the interface. In any configuration of multiple processors sharing a common interface, the processor involved must contend with other processors for use of the main storage interface. The conventional tag bit insertion sequence (FIG. 5) requires the processor to gain access to the interface twice, once for fetching data from the memory card, and once for returning data with tag bits inserted. Processor 18, by contrast, can insert tag bits with only one access to the interface.

This gives rise to another advantage, in that the tag insertion function according to the invention requires only half the amount of interface use, specifically one cycle to provide the tag insert command, and one cycle to provide the tag bits to be inserted. The conventional sequence requires four clock cycles of interface usage.

Yet another advantage arises from the fact that the memory arrays are normally inactive, and require a predetermined number of clock cycles to become charged or ready for reading data from the memory arrays, or writing data into them. The number of cycles needed of course varies with the nature of the arrays and the cycle time, but in any case adds to the time required for an operation involving access to the arrays. The conventional tag bit insertion sequence requires access to the memory arrays first to read out data for a return to the processor, and later, after the row address and column address strobes have become inactive, to write the modified data back into the arrays. By contrast, the pointer in memory card 24 is modified in a single read/modify/write sequence of three consecutive clock cycles, with no need to reactivate the row address strobe, which controls activation of the memory arrays.

Another advantage, again in contrast to the conventional sequence, is that asynchronous events such as memory refresh do not interfere with tag bit insertion or tag bit extraction functions in the memory cards of network 16. Such events can delay conventional insertion, particularly if they occur between the fetch command and store command involved with tag bit insertion. Thus, an information processing network in accordance with the present invention, in which the memory cards of main storage perform tag insertion and extraction responsive to commands from the processing devices, reduces the time and interface usage required for tag bit functions.

What is claimed is:

1. A system for processing bit-encoded data including data words, each data word having a plurality of bits including at least one tag bit, the system including:
    a processing device configuration for manipulating bit-encoded data, a memory having arrays for storing bit-encoded data as data words, each data word including at least one tag bit, and an interface connected to the processing configuration and to the memory, for transmitting bit-encoded data between the processing configuration and the memory;
    said processing configuration including means for generating first commands for extracting said tag bits from designated data words, and means for generating address data corresponding to selected locations in the memory arrays where the designated data words are stored; and
    a data manipulating means, within the memory, for selectively performing a tag bit operation on one of the designated data words in response to receiving one of the first commands from the processing configuration via the interface, said data manipulating means including:
    a. an intermediate data retaining means memory;
    b. a latching means, responsive to said one first command and to the address data corresponding to said one designated data word, for locating the one designated data word in the memory arrays and storing the at least one tag bit of the one designated data word from the selected location of said one designated data word to the intermediate data retaining means; and
    c. a means, responsive to said one first command, for extracting the at least one tag bit of said one designated data word from the intermediate data retaining means, for subsequent transmission of just the at least one extracted tag bit to the processing configuration.

2. The system of claim 1 wherein:
    said processing configuration further includes means for generating second commands for insertion of the tag bits into the designated data words, and further provides at least one tag bit corresponding to the one designated data word to the memory via the interface; and
    wherein said data manipulating means further includes (1) a means responsive to one of the second commands for inserting at least one corresponding tag bit into the one designated data word when the one designated data word is contained in the intermediate data retaining means; and (2) a write means responsive to said second command for transferring the one designated data word back to the memory arrays after the tag bit operation has been performed.

3. The system of claim 2 wherein:
    said processing configuration includes a plurality of processing devices, each of the processing devices including means for manipulating bit-encoded data and for generating the first and second commands, and wherein the memory includes a plurality of memory cards, each of the memory cards having data arrays for storing bit-encoded data.

4. The system of claim 3 wherein:
said interface includes a data bus for transmission of the corresponding tag bits, and a command bus for transmission of the first and second commands and the address information, said data bus and command bus being shared by all of the processing devices and all of the memory cards.

5. The system of claim 4 wherein:
each of the memory cards has an internal register, said internal registers cooperating to provide the intermediate data retaining means.

6. The system of claim 1 wherein:
each of said data words has the same predetermined number of bits.

7. The system of claim 6 wherein:
each of the data words has the same selected number of tag bits.

8. The system of claim 7 wherein:
each of said data words includes a plurality of working data bits and a plurality of tag bits, in a proportion of one tag bit to every thirty-two working data bits.

9. The system of claim 2 wherein:
said memory includes a plurality of memory cards, each memory card having its own ones of said data arrays for storing bit-encoded data and its own internal register, said internal registers cooperating to provide the intermediate data retaining means; and wherein each of said cards further includes circuitry associated with its internal register, for providing the one designated data word to be modified and the corresponding at least one tag bit from the processing configuration as inputs to a multiplexer receiving the corresponding tag bits as inputs to designated tag bit positions to carry out the second command, and alternatively for providing data from all of the tag bit positions to an AND logic gate and providing the output of the AND gate to the processing configuration via the interface to carry out said first command.

10. The system of claim 9 wherein:
the data words are pointer data words, and the tag bits identify each of the pointer data words as containing a valid virtual address.

11. A data processing system including:
a processing device configuration for manipulating bit-encoded data, a memory having memory arrays for storing bit-encoded data as data words, each data word including a plurality of working data bits and at least one tag bit, and an interface connected to the processing configuration and to the memory, for transmitting bit-encoded data between the processing configuration and the memory; said processing configuration including a means for generating a first command for insertion of tag bits into designated ones of the data words, and for generating address information corresponding to selected locations in the data arrays where the designated data words are stored; said processing device configuration further including a means for generating at least on tag bit corresponding to each designated data word and for providing the at least one tag bit to the memory via the interface; and a data manipulating means, within the memory, for selectively performing a tag bit function on one of the designated data words according to one of the first commands received from the processing device configuration via the interface, said data manipulating means including:
 a. an intermediate data retaining means within the memory;
 b. a latching means, responsive to said one first command and to the address data corresponding to said one designated data word, for locating the one designated data word from the selected location to the intermediate data retaining means;
 c. a means, responsive to said one first command, for receiving the at least one tag bit and applying the at least one tag bit to the one designated data word when said one designated data word is contained in the intermediate data retaining means, thereby to insert the at least one tag bit into the one designated data word; and
 d. a write means, responsive to said one first command, for transferring the one designated data word back to the memory arrays after the tag bit function has been performed.

12. The system of claim 11 wherein:
said processing device configuration further includes means for generating second commands for extraction of the tag bits in the designated data words, and wherein the data manipulating means further includes a means responsive to one of the second commands for extracting selectively at least one tag bit in the one designated data word when said one designated data word is contained in the intermediate data retaining means, for subsequent transmission of just the at least one extracted tag bit to the processing configuration.

13. The system of claim 12:
said memory includes a plurality of memory cards, each memory card having its own ones of said data arrays for storing bit-encoded data, and its own internal register, said internal registers cooperating to provide the intermediate data retaining means; and wherein each said card further includes circuitry associated with its internal register, for providing the one designated data word to be modified and the corresponding at least one tag bit as inputs to a multiplexing means for carrying out the first command, and alternatively for selectively providing bits only from tag bit positions of the one designated data word to be modified to an AND logic gate in carrying out the second command, with the output of the AND logic gate provided to the processing device configuration.

14. In a data processing system including a configuration of processors for manipulating bit-encoded data, a memory including having memory arrays for storing bit-encoded data as pluralities of data words in which each data word includes a plurality of bits and wherein the data words have a plurality of working data bits and at least one tag bit, and an interface connected to the processing configuration and to the memory for transmitting the bit-encoded data between the configuration and memory; a process for selectively inserting tag bits into data words stored in the memory arrays, including the steps of:
using the processor configuration to generate a command for inserting tag bits into bit-encoded data, address information corresponding to a selected location in the memory arrays to designate a data word stored at the selected location as the data word to be modified, and at least one tag bit corresponding to the designated data word to be modified;

transmitting the command, address information and each tag bit to the memory over the interface;

responsive to the transmission of the command and address information, locating the designated data word and transferring the designated word from the memory arrays to an intermediate retaining means in the memory; and further responsive to the command add address information, using logic in the memory to apply each of the tag bits to the designated data word at selected tag bit positions thereof when the designated word is contained in the retaining means, to insert the each of the corresponding tag bits into the designated data word.

15. The process of claim 14 including the further step of:

returning the designated data word to the memory arrays after insertion of each corresponding tag bit.

16. The process of claim 15 wherein:

said steps of transferring the designated word to the intermediate retaining means, applying each tag bit to the designated word, and returning the designated word to the memory arrays, are performed during a single read/modify/write cycle.

17. The process of claim 16 wherein:

the step of returning the data word to the arrays after tag bit insertion includes transferring the designated data word back to the selected location.

18. In a data processing system including a configuration of processors for manipulating bit-encoded data, a memory having memory arrays for storing bit-encoded data as pluralities of data words in which each data word has a plurality of working data bits and at least one tag bit, and an interface connected to the processing configuration and the memory for transmitting the bit-encoded data between the configuration and memory; a process for extracting the tag bits from data words stored in the memory arrays, including the steps of:

using the processor configuration to generate a tag command for extracting tag bits from bit-encoded data, and address information corresponding to a selected location in the memory arrays to designate a certain pointer data word stored at the selected location as the data word from which each tag bit is to be extracted;

transmitting the tag command and the address information to the memory over the interface;

responsive to the command and address information, locating the designated word and transferring at least the tag bits of the designated word from the memory arrays to an intermediate data retaining means in the memory; and further in response to the tag command and the address information, using logic in the memory to extract each of the tag bits from the data retaining means, for subsequent transmission of each extracted tag bit to the processing configuration.

19. The process of claim 18 wherein:

said steps of transferring the tag bits of the designated word to the intermediate retaining means and extracting each tag bit from the designated word, are performed during a single read/modify cycle.

* * * * *